United States Patent
Mosina et al.

(10) Patent No.: US 11,753,578 B2
(45) Date of Patent: Sep. 12, 2023

(54) METHODS OF TREATING PARAFFINS, IRON SULFIDE, HYDROGEN SULFIDE, AND/OR BACTERIA

(71) Applicant: Halliburton Energy Services, Inc., Houston, TX (US)

(72) Inventors: Yulia Mosina, Kingwood, TX (US); Kiran Gawas, Humble, TX (US); Chandrashekhar Khandekar, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/240,559

(22) Filed: Apr. 26, 2021

(65) Prior Publication Data
US 2022/0340805 A1    Oct. 27, 2022

(51) Int. Cl.
*C09K 8/524* (2006.01)
*C09K 8/532* (2006.01)

(52) U.S. Cl.
CPC .............. *C09K 8/524* (2013.01); *C09K 8/532* (2013.01); *C09K 2208/20* (2013.01)

(58) Field of Classification Search
CPC ..... C09K 8/524; C09K 8/532; C09K 2208/20
See application file for complete search history.

(56) References Cited

U.S. PATENT DOCUMENTS

| | | |
|---|---|---|
| 7,541,615 B2 | 6/2009 | Fujino et al. |
| 10,435,989 B2 | 10/2019 | Peng et al. |
| 2018/0148632 A1* | 5/2018 | Bennett ................. C23F 11/161 |

FOREIGN PATENT DOCUMENTS

| | | |
|---|---|---|
| CN | 104946222 B | 1/2018 |
| WO | 2020/014529 A1 | 1/2020 |

OTHER PUBLICATIONS

Horaska (D.D. Horaska et al., Acrolein provides benefits and solutions to offshore oilfield-production problems, SPE 146080, 2012).*
International Search Report and Written Opinion issued in related PCT Application No. PCT/US2021/029401 dated Jan. 21, 2022, 9 pages.
Reed, C., et al. "Acrolein application to mitigate biogenic sulfides and remediate injection well damage in a gas plant water disposal system." SPE International Symposium on Oilfield Chemistry. OnePetro, 2005.
Nasr-El-Din, H. A., and A. Y. Al-Humaidan. "Iron sulfide scale: formation, removal and prevention." International Symposium on Oilfield Scale. Society of Petroleum Engineers, 2001.
Salma, T. "Cost effective removal of iron sulfide and hydrogen sulfide from water using acrolein." SPE Permian Basin Oil and Gas Recovery Conference. Society of Petroleum Engineers, 2000.
Elkatatny, Salaheldin. "New formulation for iron sulfide scale removal." SPE Middle East Oil & Gas Show and Conference. Society of Petroleum Engineers, 2017.
Straub, T. J., S. W. Autry, and G. E. King. "An investigation into practical removal of downhole paraffin by thermal methods and chemical solvents." SPE Production Operations Symposium. Society of Petroleum Engineers, 1989.
Barker, K. M., M. E. Newberry, and Y. R. Yin. "Paraffin Solvation in the Oilfield." SPE International Symposium on Oilfield Chemistry. Society of Petroleum Engineers, 2001.
Gamal, Hany, Khaled Abdelgawad, and Salaheldin Elkatatny. "New Environmentally Friendly Acid System for Iron Sulfide Scale Removal." Sustainability 11.23 (2019): 6727.
Sherik, A. M., et al. "Black powder in gas transmission systems." Corrosion 2008. OnePetro, 2008.
Walker, Michael L., et al. "Iron control in west Texas sour-gas wells provides sustained production increases." Journal of Petroleum Technology 43.05 (1991): 603-607.
Mahmoud, Mohamed A., et al. "Removal of Pyrite and Different Types of Iron Sulfide Scales in Oil and Gas Wells without H 2 S Generation." International Petroleum Technology Conference. International Petroleum Technology Conference, 2015.
Horaska, Darin, et al. "Acrolein provides benefits and solutions to offshore oilfield-production problems." Oil and Gas Facilities 1.04 (2012): 47-54.
Penkala, Joseph E., Curtis A. Reed, and Jess Davis Foshee. "Acrolein application to mitigate biogenic sulfides and remediate injection well damage in a gas plant water-disposal system." SPE International Symposium and Exhibition on Formation Damage Control. Society of Petroleum Engineers, 2006.
Long, Bob. "Technology Update: Preventing Emulsions by Mitigating Solids." Journal of Petroleum Technology 69.01 (2017): 19-21.

* cited by examiner

*Primary Examiner* — Kumar R Bhushan
(74) *Attorney, Agent, or Firm* — Conley Rose, P.C.; Rodney B. Carroll

(57) ABSTRACT

Methods for treating paraffins, iron sulfide, hydrogen sulfide, and/or bacteria in subterranean operations and operations involving the production and/or transportation of oil and gas are provided. In one or more embodiments, the methods include contacting a surface comprising at least one paraffin deposit and at least one iron sulfide deposit with a treatment fluid comprising a paraffin dissolver and acrolein; and allowing the treatment fluid to at least partially dissolve or degrade the paraffin deposit and the iron sulfide deposit.

20 Claims, 4 Drawing Sheets

METHODS OF TREATING PARAFFINS, IRON SULFIDE, HYDROGEN SULFIDE, AND/OR BACTERIA

BACKGROUND

The present disclosure relates to methods for treating paraffins, iron sulfide, hydrogen sulfide, and/or bacteria in subterranean operations and operations involving the production and/or transportation of oil and gas.

Paraffins are fully saturated hydrocarbons that remain soluble in crude oil under reservoir conditions. Paraffinic solids tend to precipitate from crude oil as a result of depressurization and cooling during oil and gas production. Paraffinic solids may become entrained in hydrocarbons (e.g., crude oil) and may also form deposits on surfaces in subterranean formations and surfaces of conduits (e.g., pipelines, well casings, production tubing), containers, equipment, and other surfaces used in oil and gas production. Paraffinic solids often present significant problems because, among other reasons, the solids may at least partially block the flow of fluids through conduits, pipelines, or the subterranean formation, reduce production throughput, increase the viscosity of crude oil, and stabilize undesirable emulsions with the crude oil.

Hydrogen sulfide, $H_2S$, is a naturally occurring contaminant of fluids used in the oil and gas industry. The corrosive nature of hydrogen sulfide and its reaction with steel and other metals used in the oil and gas production often causes the accumulation of iron sulfide solids. Iron sulfide solids may become entrained in hydrocarbons (e.g., crude oil) and may also form deposits on surfaces in subterranean formations and surfaces of conduits (e.g., pipelines, well casings, production tubing), containers, equipment, and other metal surfaces used in oil and gas production. Iron sulfide solids may present significant problems because, among other reasons, the solids may hinder accurate determinations of pipeline structural integrity, at least block the flow of fluids through conduits, pipelines, or the subterranean formation, and/or interfere with the operation of pumps, valves, and other metal equipment. Heavy iron sulfide solids also may choke production (e.g., in the production tubing, perforations or within the producing formation itself) and may result in pipe failure. Iron sulfide solids deposited on surfaces may also provide harborage for bacteria that promotes under-deposit corrosion.

Iron sulfide solids may be removed mechanically, chemically, or using a combination of the two. Chemical methods include using, for example, an acid (e.g., HCl) or alkaline chemical additives to dissolve and/or disperse the solids. There are significant risks associated with acid treatments, especially in high temperature, high-pressure gas wells. These risks include corrosivity of acid at high temperature and the liberation of toxic hydrogen sulfide ($H_2S$) gas during the treatment that may compromise the integrity of the pipeline/facility. Alkaline chemical additives have limited ability to dissolve iron sulfide solids and therefore may require high volumes and extended contact times.

BRIEF DESCRIPTION OF THE DRAWINGS

These drawings illustrate certain aspects of some of the embodiments of the present disclosure and should not be used to limit or define the claims.

Figure 1:
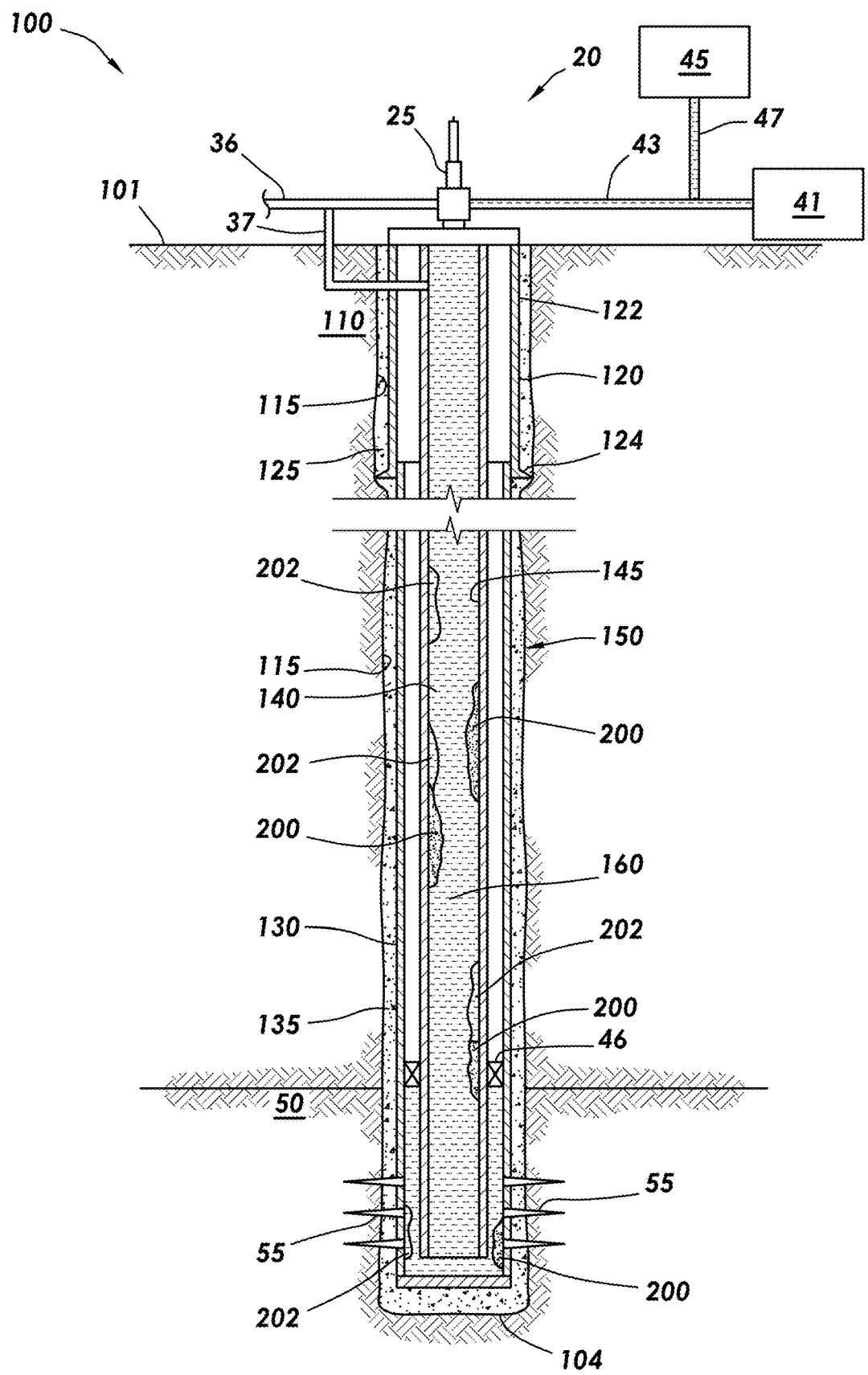
FIG. 1 is a cross sectional view of a well site constructed for hydrocarbon production that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those of ordinary skill in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming but would nevertheless be a routine undertaking for those of ordinary skill in the art having the benefit of the present disclosure.

The present disclosure relates to methods for treating paraffins, iron sulfide, hydrogen sulfide, and/or bacteria in subterranean operations and operations involving the production and/or transportation of oil and gas. More specifically, the present disclosure provides methods for contacting a surface and/or crude oil including paraffins, iron sulfide, and/or hydrogen sulfide with a treatment fluid that includes a paraffin dissolver and acrolein. In certain embodiments, the methods of the present disclosure may also include allowing the treatment fluid to at least partially dissolve or degrade the paraffin and the iron sulfide and/or to at least partially scavenge the hydrogen sulfide. In certain embodiments, the methods of the present disclosure may also include forming the treatment fluid by simultaneously introducing the paraffin dissolver and the acrolein into a location including the surface and/or the crude oil. In other embodiments, the methods of the present disclosure may include forming the treatment fluid by contacting the paraffin dissolver and the acrolein and then introducing the treatment fluid into a location including the surface and/or the crude oil.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, drilling, fracturing, competition, and the like.

Among the many potential advantages to the methods of the present disclosure, only some of which are alluded to herein, the methods and compositions of the present disclosure may provide for simultaneous degradation and/or dissolution of paraffins and iron sulfide solids deposited on surfaces and/or entrained in crude oil, which may yield more effective results than separate treatments for each. The methods and compositions of the present disclosure may also prevent re-agglomeration of paraffins and iron sulfide within crude oil and/or re-deposition of paraffins and iron sulfide onto surfaces after it has been at least partially dissolved and/or degraded. The methods and compositions of the present disclosure may also provide for nearly instantaneous scavenging of hydrogen sulfide, which is often present in crude oil and, if untreated, may form iron sulfide deposits and lead to corrosion of metal (e.g., carbon steel) surfaces. The methods and compositions of the present disclosure may also provide for at least partial removal and/or control of bacteria trapped on surfaces beneath paraffin and/or iron sulfide deposits, which, if untreated, may promote under-deposit corrosion of metal surfaces.

The treatment fluids of the present disclosure may include one or more paraffin dissolvers. In certain embodiments, the one or more paraffin dissolvers may include an aliphatic hydrocarbon, an aromatic hydrocarbon, or any combination thereof. Examples of suitable aliphatic hydrocarbon include, but are not limited to, pentane, hexane, heptane, and any combination thereof. Examples of suitable aromatic hydrocarbon include, but are not limited to, benzene, xylene, toluene, naphthalene, anthracene, phenanthrene, pyrene, chrysene, and any combination thereof. In certain embodiments, the amount of the paraffin dissolver in the treatment fluid may depend on, among other things, the surface area of the surface to be treated (e.g., the length of a pipeline, the size of a wellbore), the volume of deposit to be treated, and/or the volume of paraffin dissolver necessary to dissolve a fixed amount of paraffin (e.g., as determined through a paraffin sample dissolution test).

The treatment fluids of the present disclosure may include acrolein. In certain embodiments, the acrolein may be present in the treatment fluid in an amount from about 50 ppm to about 20 wt. % by weight of the treatment fluid. In other embodiments, the acrolein may be present in the treatment fluid in an amount from about 1.5 wt. % to about 20 wt. % by weight of the treatment fluid. In other embodiments, the acrolein may be present in the treatment fluid in an amount from about 0.5 wt. % to about 1.5 wt. % by weight of the treatment fluid.

In certain embodiments, one or more additives may be added to the paraffin dissolver to form a pre-mixed fluid, which may in turn be combined with the acrolein to form treatment fluids of the present disclosure. Any additive that is compatible with acrolein may be used in the pre-mixed fluids, and ultimately, the treatment fluids, of the present disclosure. Examples of such additives include, but are not limited to, surfactants, acids, emulsion breakers, and any combination thereof. The terms "combined," "blended," "contacted, "mixed" and grammatical are used synonymously herein. Use of these terms does not imply any particular degree of mixing.

In certain embodiments, one or more surfactants may be added to the paraffin dissolver to form a pre-mixed fluid of the present disclosure. In such embodiments, the one or more surfactants may enhance or improve penetration of the paraffin dissolver and/or the acrolein through oil-wet surfaces. In such embodiments, the one or more surfactants may be a nonionic surfactant. Examples of suitable nonionic surfactants include, but are not limited to, alkoxylated linear alcohols, alkoxylated alkyl phenols, fatty acid esters, amine and amide derivatives, alkylpolyglucosides, ethylene oxide and propylene oxide copolymers polyalcohols and alkoxylated polyalcohols, and any combination thereof. In certain embodiments, the one or more surfactants may be present in the pre-mixed fluid in an amount from about 500 ppm to about 20 wt. % by weight of the pre-mixed fluid. In other embodiments, the one or more surfactants may be present in the pre-mixed fluid in an amount from about 1 wt. % to about 20 wt. % by weight of the pre-mixed fluid. In other embodiments, the one or more surfactants may be present in the pre-mixed fluid in an amount from about 0.04 wt. % to about 5 wt. % by weight of the pre-mixed fluid.

In certain embodiments, one or more acids may be added to the paraffin dissolver to form a pre-mixed fluid of the present disclosure. In such embodiments, the one or more acids may lower the pH of the treatment fluids of the present disclosure, which in turn may at least partially dissolve the iron sulfide located on a surface and/or in crude oil and/or increase of half-life of the acrolein. In certain embodiments, the treatment fluids of the present disclosure may have a pH of about 4 or less. Examples of suitable acids include, but are not limited to, hydroxy acids (e.g., citric acid, lactic acid, glycolic acid, tartaric acid, and malic acid), carboxylic acids containing one or more —COOH group (saturated or unsaturated), and any combination thereof. Examples of suitable carboxylic acids include, but are not limited to, carboxylic acids (e.g., formic acid, acetic acid) and dicarboxylic acids (e.g., oxalic acid, malonic acid, and glutaric acid). In certain embodiments, the one or more acids may be present in the pre-mixed fluid in an amount from about 0.5 wt. % to about 20 wt. % by weight of the pre-mixed fluid. In other embodiments, the one or more acids may be present in the pre-mixed fluid in an amount from about 0.5 wt. % to about 5 wt. % by weight of the pre-mixed fluid. In other embodiments, the one or more acids may be present in the pre-mixed fluid in an amount from about 5 wt. % to about 15 wt. % by weight of the pre-mixed fluid. In other embodiments, the treatment fluids of the present disclosure may not include any acids. In such embodiments, omitting acid from the treatment fluids of the present disclosure may avoid corrosion of metals and/or generation of toxic hydrogen sulfide gas.

In certain embodiments, one or more emulsion breakers may be added to the paraffin dissolver to form a pre-mixed fluid of the present disclosure. In such embodiments, because solids, such as paraffin and iron sulfide, may stabilized emulsions (e.g., water-in-oil or oil-in-water), the one or more emulsion breakers may at least partially aid in the removal of paraffin and iron sulfide from fluids produced from subterranean formations (e.g., crude oil). In certain embodiments, the one or more emulsion breakers may be present in the pre-mixed fluid in an amount from about 0.1 wt. % to about 20 wt. % by weight of the pre-mixed fluid. In other embodiments, the one or more emulsion breakers may be present in the pre-mixed fluid in an amount from about 1 wt. % to about 20.0 wt. % by weight of the pre-mixed fluid. In other embodiments, the one or more emulsion breakers may be present in the pre-mixed fluid in an amount from about 0.1 wt. % to about 10 wt. % by weight of the pre-mixed fluid.

In certain embodiments, the treatment fluids of the present disclosure may not include any water. Traditional iron sulfide dissolvers (e.g., acids, iron chelators) are not compatible with hydrocarbon-based paraffin dissolvers and thus must be introduced using a water-based fluid. As a result, traditional iron sulfide dissolvers have been introduced separately from paraffin dissolvers into a location that contains both paraffin and iron sulfide solids. Without limiting the present disclosure to a particular theory, the iron sulfide dissolver of the present disclosure (i.e., acrolein) is compatible with the hydrocarbon-based paraffin dissolvers of the present disclosure such that the two dissolvers may be introduced simultaneously and without any water-based fluids. The simultaneous introduction of acrolein and the paraffin dissolver may result in more effective dissolution and/or degradation of iron sulfide and paraffin solids from a surface and/or within in crude oil, particularly where paraffins and iron sulfide have co-deposited together onto a surface.

In certain embodiments, the methods of the present disclosure may include introducing the treatment fluids of the present disclosure into a location containing paraffin solids and iron sulfide solids. Examples of such locations include, but are not limited to, a subterranean formation, a wellbore penetrating at least a portion of a subterranean formation, a production casing, a production tubing, a pipeline, a storage vessel, a pump, a heat exchanger, a separator, a heat treater, and any combination thereof. In certain embodiments, the paraffin solids and the iron sulfide solids may be located within (e.g., entrained in) crude oil within the location. In other embodiments, the paraffin solids and the iron sulfide solids may be deposits located on a surface within the location.

In certain embodiments, the methods of the present disclosure may include forming the treatment fluids of the present disclosure. In certain embodiments, the paraffin dissolver (or with additives, the pre-mixed fluid) and the acrolein may be combined to form the treatment fluid. In such embodiments, the treatment fluid may be stored for a period of time (e.g., up to 24 hours) before being introduced (e.g., injected) into a location containing paraffin solids and iron sulfide solids (e.g., in crude oil or on a surface). In other embodiments, the paraffin dissolver (or with additives, the pre-mixed fluid) and the acrolein may be simultaneously introduced into a location containing paraffin solids and iron sulfide solids (e.g., in crude oil or on a surface) to form the treatment fluid. In such embodiments, the paraffin dissolver (or with additives, the pre-mixed fluid) and the acrolein may be injected via separate injection points into a single injection line fluidly connected to the location, and they may come into contact in the injection line to form the treatment fluid. In such instances, the injection line should be understood to constitute a part of the location (e.g., the wellbore, the pipeline) as that term is used herein.

In certain embodiments, the methods of the present disclosure may include contacting a surface containing at least one paraffin deposit and at least one iron sulfide deposit with a treatment fluid including a paraffin dissolver (or with additives, a pre-mixed fluid) and acrolein. In certain embodiments, the methods of the present disclosure may also include allowing the treatment fluid to at least partially dissolve or degrade the paraffin deposit and the iron sulfide deposit. In certain embodiments, the surface may also contain bacteria. In such embodiments, the acrolein may act as a biocide, and the method of the present disclosure may also include allowing the treatment fluid at least partially remove and/or control the bacteria.

In certain embodiments, the methods of the present disclosure may include contacting a crude oil including paraffin and iron sulfide with a treatment fluid including a paraffin dissolver (or with additives, a pre-mixed fluid) and acrolein. In certain embodiments, the methods of the present disclosure may also include allowing the treatment fluid to at least partially dissolve or degrade the paraffin and the iron sulfide. In certain embodiments, the crude oil may also contain hydrogen sulfide. In such embodiments, the acrolein may act as a hydrogen sulfide scavenger by reacting with the hydrogen sulfide, and the methods of the present disclosure may also include allowing the treatment fluid to at least partially remove the hydrogen sulfide from the crude oil.

In certain embodiments, the paraffins and/or the iron sulfide may not fully dissolve or degrade. In such embodiments, the treatment fluids of the present disclosure may prevent re-agglomeration and/or re-deposition of the paraffin and/or the iron sulfide. In such embodiments, the partially dissolved or degraded paraffin and/or iron sulfide may safely flow through a location (e.g., with the crude oil contained therein).

FIG. 1 shows a cross sectional view of a well site 100 constructed for hydrocarbon production. The well site 100 generally includes a wellbore 150 and a wellhead 20. The wellbore 150 includes a bore 115 for receiving completion equipment and fluids. The bore 115 extends from a surface 101 of the earth, and down into the earth's subsurface 110. The wellbore 150 is first formed with a string of surface casing 120. The surface casing 120 has an upper end 122 in sealed connection with the well head 20. The surface casing 120 also has a lower end 124. The surface casing 120 is secured in the wellbore 150 with a surrounding cement sheath 125. The cement sheath 125 resides in an annular region formed between the surface casing 120 and the surrounding earth subsurface 110. The wellbore 150 also includes a lower string of casing 130. The lower string of casing 130 is also secured in the wellbore 150 with a surrounding cement sheath 135. The lower string of casing 130 extends down to a bottom 104 of the wellbore 150. The lower string of casing 130 traverses a hydrocarbon-bearing subterranean formation 50. Therefore, the lower string of casing 130 is referred to as production casing.

Although shown as vertical, the wellbore 150 may include horizontal, vertical, slant, curved, and/or other types of wellbore geometries and orientations. It is understood that the wellbore 150 may and likely will include at least one additional string of casing (not shown) residing between the surface (or conductor) casing 120 and the lower (or production) casing 130. These intermediate strings of casing may be hung from the surface. Alternatively, they may be hung from a next higher string of casing using a liner hanger. It is understood that the embodiments of the present disclosure are not limited to the type of casing arrangement used.

The wellbore 150 also includes a string of production tubing 140. The production tubing 140 extends from a tubing hanger at the well head 20, down proximate to the hydrocarbon-bearing subterranean formation 50. The production tubing 140 includes a bore 145 that transports production fluids from the hydrocarbon-bearing subterranean formation 50 up to the well head 20. The wellbore 150 further has a production packer 46. The production packer 46 sits just above or proximate to the top of the formation 50 and seals an annular area between the production tubing 140 and the surrounding casing 130. The production packer 46 keeps reservoir fluids from migrating behind the tubing 140 during production.

The well bore 150 may further comprise one or more pumps (not shown) installed in the production tubing 140 for lifting production fluids up to the surface 101. The pump may be, for example, an electrical submersible pump, a jet pump, a gas lift, or a hydraulic pump. In order to provide fluid communication between the hydrocarbon-bearing subterranean formation 50 and the production tubing 140, the production casing 130 has been perforated. A series of perforations are shown at 55. It is understood that the wellbore 150 may be completed using a pre-perforated pipe, a sand screen, a gravel pack, or some combination thereof in lieu of perforated casing.

As noted, the well site 100 also includes a well head 20, which includes a Christmas tree 25 that includes various valves spools, pressure gauges and chokes fitted to the wellhead of a completed well to control production and/or injection of fluids into the well. For example, well head 20 may include separate oil 36 and gas 37 production lines. In some embodiments, the well head 20 may be operatively connected to a pump jack, which may use sucker rods and/or other equipment used to operate pump 170.

It is understood that the well site 100 arrangement of FIG. 1 is merely illustrative. In some instances, the hydrocarbon-bearing subterranean formation 50 will possess sufficient reservoir pressure to allow production fluids to be produced to the surface 101 without need of a fluid pump 170 and/or other equipment. In that instance, a well head having a crown valve and/or master valves will be sufficient.

Referring now to FIG. 1, methods in accordance with certain embodiments of the present disclosure will be described. It is oftentimes desirable to treat certain of the wellbore components (such as the production tubing 140) for paraffin and iron sulfide solids. For example, one or more deposits including paraffin 200 and one or more deposits including iron sulfides 202 may reside inside the production tubing 140 and in the annular space between the production tubing 140 and the casing 130 near perforations 55. However, one of skill in the art would recognize that the methods of the present disclosure may be used to remove paraffin and/or iron sulfide residing in any area of the well bore, formation, and/or equipment installed therein as well as in crude oil produced from the formation. In certain embodiments, one or more samples are taken of the material in deposits 200 and 202 prior to treatment, for example, using a downhole sampling tool such as a bailer (not shown) and/or by analyzing fluid samples taken from the well 150 at the surface 101. These samples may be analyzed to determine what types of paraffin and iron sulfides are present in deposits 200 and 202 and/or the amount and type of dissolver necessary for treatment.

A first hydraulic pump and tank unit 41 is installed at or transported to the well site 100 and is connected to the wellhead 20 via injection line 43. The first tank unit 41 may contain a paraffin dissolver or, in accordance with certain embodiments of the present disclosure, a pre-mixed fluid including a paraffin dissolver and one or more additives (e.g., a surfactant, an acid, and/or an emulsion breaker). The paraffin dissolver (or with additives, the pre-mixed fluid) is injected into the production tubing 140 via injection line 43. A second hydraulic pump and tank unit 45 is installed at or transported to the well site 100 and is connected to the wellhead 20 via injection line 43 and injection point 47. The second tank unit 45 may contain acrolein, and the acrolein may be injected into injection line 43 via injection point 47 and combined with the paraffin dissolver (or with additives, the pre-mixed fluid) from the first tank unit 41 to form a treatment fluid 160 before entering the production tubing 140. The treatment fluid 160 may be allowed to soak in the production tubing 140 to at least partially dissolve and/or degrade the paraffin deposits 200 and the iron sulfide scale deposits 202. Treatment fluid 160 then may be circulated or pumped out of the production tubing 140, after which the well bore 150 may be returned to production.

An embodiment of the present disclosure is a method including: contacting a surface comprising at least one paraffin deposit and at least one iron sulfide deposit with a treatment fluid comprising a paraffin dissolver and acrolein; and allowing the treatment fluid to at least partially dissolve or degrade the paraffin deposit and the iron sulfide deposit.

In one or more embodiments described in the preceding paragraph, forming the treatment fluid by simultaneously introducing the paraffin dissolver and the acrolein into a location containing the surface. In one or more embodiments described in the preceding paragraph, the surface is located on at least one of the following: a subterranean formation, a wellbore penetrating at least a portion of a subterranean formation, a production casing, a production tubing, a pipeline, a storage vessel, a pump, a heat exchanger, a separator, a heat treater, and any combination thereof. In one or more embodiments described in the preceding paragraph, the treatment fluid comprises acrolein in an amount from about 50 ppm to about 20% by weight of the treatment fluid. In one or more embodiments described in the preceding paragraph, the treatment fluid does not contain any water. In one or more embodiments described in the preceding paragraph, the paraffin dissolver comprises an aliphatic hydrocarbon, an aromatic hydrocarbon, or any combination thereof. In one or more embodiments described in the preceding paragraph, the treatment fluid further comprises at least one additive selected from the group consisting of: a surfactant, an acid, an emulsion breaker, and any combination thereof. In one or more embodiments described in the preceding paragraph, adding at least one additive to the paraffin dissolver to form a pre-mixed fluid; and contacting the pre-mixed fluid with the acrolein to form the treatment fluid.

Another embodiment of the present disclosure is a method including: contacting a crude oil comprising paraffin and at least one of hydrogen sulfide and iron sulfide with a treatment fluid comprising a paraffin dissolver and acrolein; and allowing the treatment fluid to at least partially dissolve or degrade the paraffin and at least one of the hydrogen sulfide and the iron sulfide.

In one or more embodiments described in the preceding paragraph, forming the treatment fluid by simultaneously introducing the paraffin dissolver and the acrolein into a location containing the crude oil. In one or more embodiments described in the preceding paragraph, the crude oil is located in at least one of the following: a subterranean formation, a wellbore penetrating at least a portion of a subterranean formation, a production casing, a production tubing, a pipeline, a storage vessel, a pump, a heat exchanger, a separator, a heat treater, and any combination thereof. In one or more embodiments described in the preceding paragraph, the treatment fluid comprises acrolein in an amount from about 50 ppm to about 20% by weight of the treatment fluid. In one or more embodiments described in the preceding paragraph, the treatment fluid does not contain any water. In one or more embodiments described in the preceding paragraph, the paraffin dissolver comprises an aliphatic hydrocarbon, an aromatic hydrocarbon, or any combination thereof. In one or more embodiments described in the preceding paragraph, the treatment fluid further comprises at least one additive selected from the group consisting of: a surfactant, an acid, an emulsion breaker, and any combination thereof. In one or more embodiments described in the preceding paragraph, adding at least one additive to the paraffin dissolver to form a pre-mixed fluid; and contacting the pre-mixed fluid with the acrolein to form the treatment fluid.

Another embodiment of the present disclosure is a method including: simultaneously introducing acrolein and a paraffin dissolver into a location to form a treatment fluid, wherein the location is selected from the group consisting of: a subterranean formation, a wellbore penetrating at least a portion of a subterranean formation, a production casing, a production tubing, a pipeline, a storage vessel, a pump, a heat exchanger, a separator, a heat treater, and any combination thereof and allowing the treatment fluid at least partially dissolve the paraffin and the iron sulfide.

the paraffin and the iron sulfide are deposited on a surface within the location. In one or more embodiments described in the preceding paragraph, the paraffin and the iron sulfide are in a crude oil within the location. In one or more embodiments described in the preceding paragraph, adding at least one additive to the paraffin dissolver before introducing the paraffin dissolver into the location, wherein the additive is selected from the group consisting of: a surfactant, an acid, an emulsion breaker, and any combination thereof.

EXAMPLES

To facilitate a better understanding of the present disclosure, the following examples of certain aspects of certain embodiments are given. The following examples are not the only examples that could be given according to the present disclosure and are not intended to limit the scope of the disclosure or claims.

Example 1

Six fluid samples were prepared according to Table 1 below by mixing a paraffin dissolver of the present disclosure and acrolein:

TABLE 1

| Fluid Sample | Paraffin Dissolver | Amount of Acrolein |
|---|---|---|
| A | Xylene | 25 vol. % |
| B | Xylene | 50 vol. % |
| C | Hexane | 25 vol. % |
| D | Hexane | 50 vol. % |
| E | Toluene | 25 vol. % |
| F | Toluene | 50 vol. % |

Each fluid was stored at room temperature and observed over four days. During four days of observation, no color changes, precipitation, or other visual changes were observed. Thus, Example 1 demonstrates the compatibility of acrolein with several paraffin dissolvers of the present disclosure.

Example 2

Figure 2A:
FIGS. 2A and 2B are series of photographs depicting treatment fluids in accordance with certain embodiments of the present disclosure.
Figure 2B:

About 800 ppm of iron sulfide solids was added to xylene to prepare 15 mL of a fluid. The fluid was then aliquoted into two bottles. The first bottle was maintained as a control, and 1.5 wt. % of acrolein was added to the second bottle. FIG. 2A shows the first bottle 300 and the second bottle 302 after 10 minutes at room temperature. FIG. 2B shows the first bottle 300 and the second bottle 302 after 4 days at room temperature. As seen in FIGS. 2A and 2B, the iron sulfide was dissolved by the acrolein in the second bottle 302. Thus, Example 2 demonstrates the ability of acrolein to dissolve iron sulfide in the absence of water.

Example 3

Five cold fingers were prepared to simulate paraffin deposition on a pipe wall as a result of temperature difference between the pipe wall surface and oil within the pipe. To prepare the cold fingers, an oil sample containing paraffin and iron sulfide was placed into a stir-plate within a heated block. The oil sample was maintained well above the Wax Appearance Temperature ("WAT"), which is the highest temperature at which the paraffin precipitated from the oil phase, to ensure that the paraffin was completely solubilized in the oil sample. Each of the five cold fingers were placed into the oil sample, and a cold fluid (a mixture of water and ethylene glycol) having a temperature at least 10° F. below WAT was circulated through tubes entering and leaving the cold finger for about 18 hours. There was no contact between the cold fluid and the oil sample. The circulation of the cold fluid through the cold finger created a thermal driving force similar to that observed between a pipe wall surface and oil within the pipe. Deposits including paraffin, along with oil and iron sulfide, formed on each of the cold fingers. After about 18 hours, each of the cold fingers with the deposited paraffin and occluded iron sulfide was placed into a glass bottle.

Figure 3A:
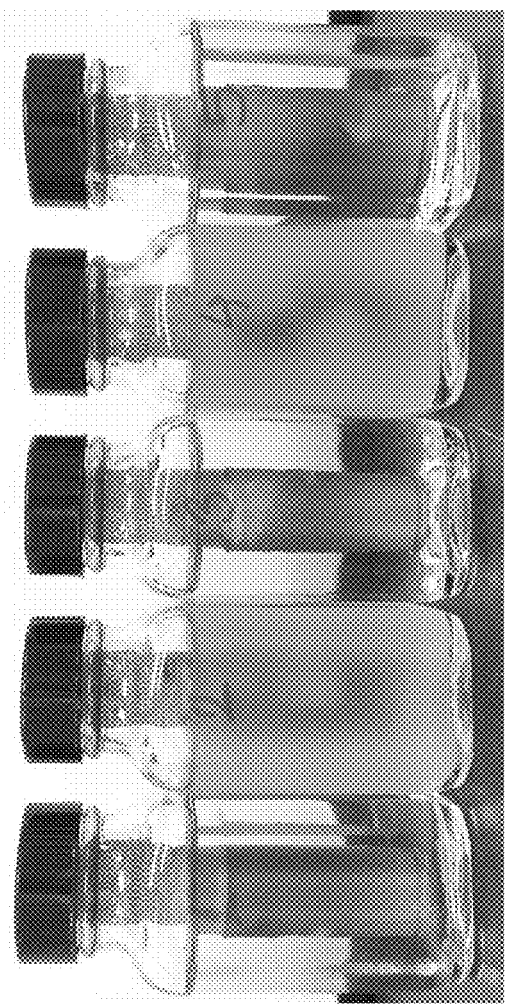
FIGS. 3A and 3B are series of photographs depicting treatment fluids in accordance with certain embodiments of the present disclosure.
Figure 3B:

Five fluid samples were prepared according to Table 2 below. As shown in FIG. 3A, each fluid sample was added to a glass bottle containing a cold finger. The bottles containing the fluid samples and cold fingers were then maintained at room temperature for 15 days. FIG. 3B shows the bottles after 15 days at room temperature.

TABLE 2

| Fluid Sample | Base Fluid | Amount of Acrolein |
|---|---|---|
| 1 | Xylene | 0 vol. % |
| 2 | Xylene | 5 vol. % |
| 3 | Water | 5 vol. % |
| 4 | Xylene | 10 vol. % |
| 5 | Water | 10 vol. % |

Figure 4:
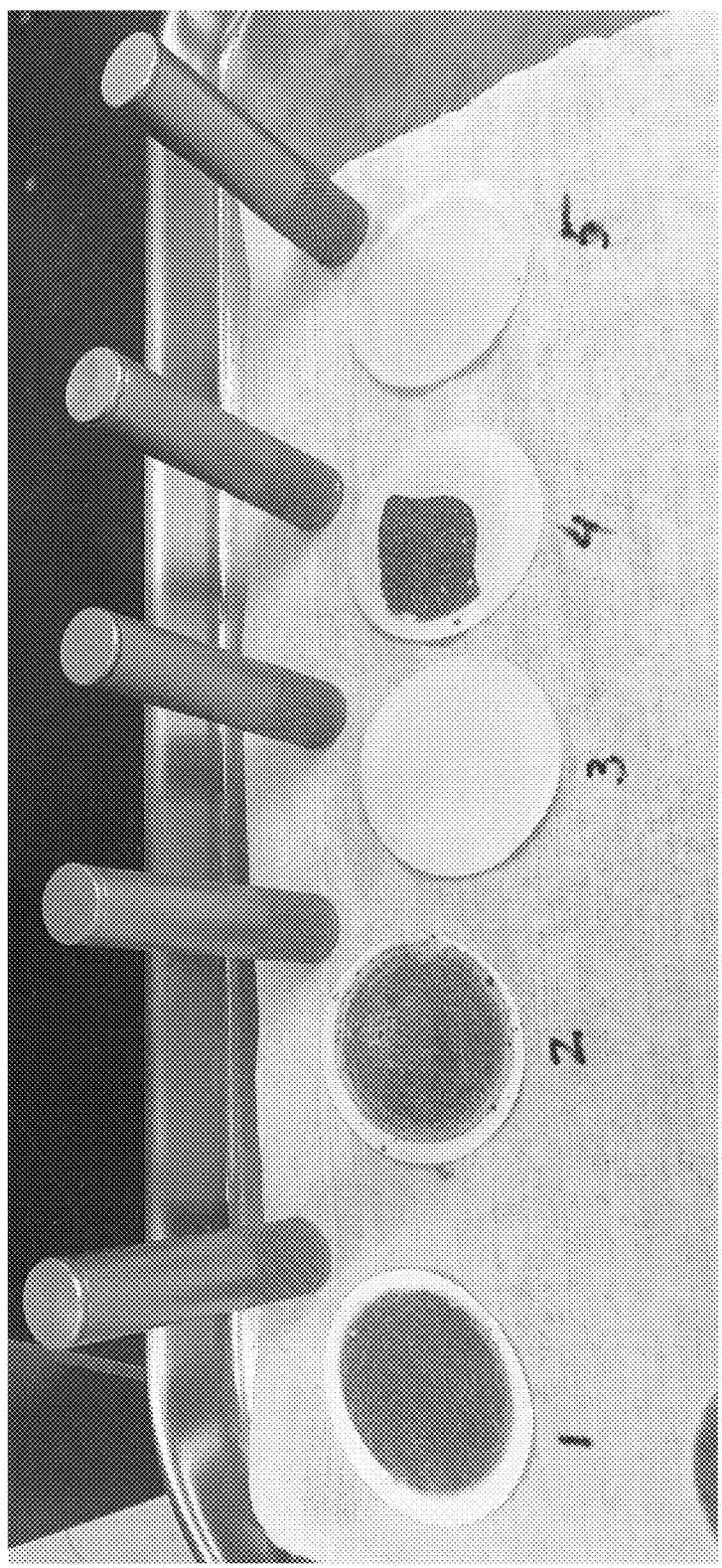
FIG. 4 is a photograph depicting filters with solids collected from treatment fluids in accordance with certain embodiments of the present disclosure.

After 15 days at room temperature, each bottle was placed in a 60° C. water bath for 2 hours. The cold finders were then removed from the bottles, and each fluid sample was filtered through a 5 μm nylon filter, which was weighed both before and after the fluid sample was filtered. The results are shown in FIG. 4 and Table 3 below.

TABLE 3

| Fluid Sample | Base Fluid | Amount of Acrolein | Filter Weight (g) Before | Filter Weight (g) After | Solids (g) | Comparison to Fluid Sample 1 |
|---|---|---|---|---|---|---|
| 1 | Xylene | 0 vol. % | 0.0857 | 0.1089 | 0.0232 | — |
| 2 | Xylene | 5 vol. % | 0.0944 | 0.1013 | 0.0069 | 29.74% |
| 3 | Water | 5 vol. % | 0.088 | 0.0926 | 0.0046 | No paraffin present |

TABLE 3-continued

| Fluid Sample | Base Fluid | Amount of Acrolein | Filter Weight (g) Before | Filter Weight (g) After | Solids (g) | Comparison to Fluid Sample 1 |
|---|---|---|---|---|---|---|
| 4 | Xylene | 10 vol. % | 0.1033 | 0.1088 | 0.0055 | 23.71% |
| 5 | Water | 10 vol. % | 0.0908 | 0.097 | 0.0062 | No paraffin present |

As shown in FIG. 4, the deposits were not dissolved from the cold fingers in the fluid samples that contained water as the base fluid (i.e., Fluid Samples 3 and 5), and the deposits were completely removed and/or dissolved from the cold fingers in the samples containing a paraffin dissolver (i.e., Fluid Samples 1, 2, and 4). Additionally, Fluid Samples 2 and 4, which contained both a paraffin dissolver and acrolein, has about 70% and about 76% less solids remaining in the sample, respectively, relative to Fluid Sample 1, which contained only a paraffin dissolver. Thus, Example 3 demonstrates that acrolein is able to dissolve iron sulfide from the paraffin deposits when used simultaneously with a paraffin dissolver.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those of ordinary skill in the art having the benefit of the teachings herein. While numerous changes may be made by those of ordinary skill in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
adding at least one additive selected from the group consisting of: a surfactant, an acid, and an emulsion breaker to a paraffin dissolver to form a pre-mixed fluid; and contacting the pre-mixed fluid with an iron sulfide dissolver consisting of acrolein to form a treatment fluid substantially free of water;
contacting a surface comprising at least one paraffin deposit and at least one iron sulfide deposit with the treatment fluid, wherein the surface is simultaneously contacted with the paraffin dissolver and the iron sulfide dissolver; and
allowing the treatment fluid to at least partially dissolve or degrade the paraffin deposit and the iron sulfide deposit.

2. The method of claim 1, wherein the surface is located on: a subterranean formation, a wellbore penetrating at least a portion of the subterranean formation, a production casing, a production tubing, a pipeline, a storage vessel, a pump, a heat exchanger, a separator, a heat treater, or any combination thereof.

3. The method of claim 1, wherein the treatment fluid comprises the acrolein in an amount from about 50 ppm to about 20% by weight of the treatment fluid.

4. The method of claim 1, wherein the paraffin dissolver comprises an aliphatic hydrocarbon, an aromatic hydrocarbon, or any combination thereof.

5. The method of claim 1, wherein the paraffin dissolver comprises pentane, hexane, heptane, benzene, xylene, toluene, naphthalene, anthracene, phenanthrene, pyrene, chrysene, or any combination thereof.

6. The method of claim 1, wherein the surfactant comprises a nonionic surfactant, comprising an alkoxylated linear alcohol, an alkoxylated alkyl phenol, a fatty acid ester, an amine derivative, an amide derivative, an alkylpolyglucoside, an ethylene oxide, a propylene oxide copolymer, a polyalcohol, an alkoxylated polyalcohol, or a combination thereof.

7. The method of claim 1, wherein the surfactant is in the pre-mixed fluid in an amount from about 500 ppm to about 20 wt. % by weight of the pre-mixed fluid.

8. The method of claim 1, wherein the acid comprises a hydroxy acid, a saturated or unsaturated carboxylic acid containing one or more -COOH groups, or a combination thereof.

9. The method of claim 8, wherein the acid comprises the hydroxy acid, comprising a citric acid, a lactic acid, a glycolic acid, a tartaric acid, a malic acid, or a combination thereof.

10. The method of claim 8, wherein the acid comprises the saturated or unsaturated carboxylic acid, comprising a formic acid, an acetic acid, an oxalic acid, a malonic acid, a glutaric acid, or a combination thereof.

11. The method of claim 1, wherein the treatment fluid has a pH of about 4 or less.

12. The method of claim 1, wherein the paraffin dissolver comprises xylene.

13. The method of claim 1, wherein the treatment fluid comprises about 5 to about 10 vol. % of the iron sulfide dissolver consisting of the acrolein, and the paraffin dissolver comprises xylene.

14. The method of claim 1, wherein the paraffin dissolver comprises xylene, hexene, or toluene.

15. (Previously Presented The method of claim 1, wherein the treatment fluid comprises about 25 to about 50 vol. % of the iron sulfide dissolver consisting of the acrolein.

16. The method of claim 15, wherein the paraffin dissolver comprises xylene, hexene, or toluene.

17. The method of claim 1, wherein the treatment fluid comprises about 5 to about 10 vol. % of the iron sulfide dissolver consisting of the acrolein.

18. The method of claim 11, wherein the paraffin dissolver comprises xylene.

19. The method of claim 5, wherein the treatment fluid comprises about 5 to about 10 vol. % of the iron sulfide dissolver consisting of the acrolein.

20. The method of claim 16, wherein the treatment fluid comprises about 5 to about 10 vol. % of the iron sulfide dissolver consisting of the acrolein.

\* \* \* \* \*